(12) United States Patent
Paice

(10) Patent No.: US 7,750,782 B1
(45) Date of Patent: Jul. 6, 2010

(54) NINE-PHASE AUTOTRANSFORMER

(76) Inventor: Derek Albert Paice, 114 Rosewood Ct., Palm Harbor, FL (US) 34685

( * ) Notice: Subject to any disclaimer, the term of this patent is extended or adjusted under 35 U.S.C. 154(b) by 23 days.

(21) Appl. No.: 12/378,796

(22) Filed: Feb. 20, 2009

(51) Int. Cl.
*H01F 30/12* (2006.01)
(52) U.S. Cl. .......................... 336/12; 363/148; 363/153
(58) Field of Classification Search ................ 336/12
See application file for complete search history.

(56) References Cited

U.S. PATENT DOCUMENTS 6,249,443 B1 * 6/2001 Zhou et al. ..................... 363/5
6,335,872 B1 * 1/2002 Zhou et al. ................... 363/154
7,274,280 B1 * 9/2007 Paice .......................... 336/148

* cited by examiner

*Primary Examiner*—Elvin G Enad
*Assistant Examiner*—Joselito Baisa

(57) ABSTRACT

A polygon connected three-phase autotransformer using six windings per phase provides a reduced power rating nine-phase power source suitable for 18-pulse AC to DC power converters. The windings are selected and connected in a manner that controls harmonic currents and minimizes total kVA rating. When the autotransformer is used to power a nine-phase AC to DC converter its kVA rating is typically less than 48% of the DC load kW. Additional isolated windings can provide means for the invention to operate as an efficient double-wound transformer.

12 Claims, 10 Drawing Sheets

THREE-PHASE INPUT

40° TYP.

NINE-PHASE OUTPUT

THREE-PHASE INPUT

NINE-PHASE OUTPUT

THREE-PHASE INPUT

NINE-PHASE OUTPUT

NINE-PHASE AUTOTRANSFORMER

FIELD OF THE INVENTION

The invention relates to static AC to DC power converters such as can be used for AC or DC motor drive systems.

REFERENCES CITED

U.S. Patent Documents 5,619,407 July 1997 Hammond 6,335,872 January 2002 Zhou, et. al.

7,274,280 September 2005 Paice

Other Publications

"Evaluation of Three-Phase to Nine-Phase Transformer . . . Including Novel Third Harmonic Calculations." J. E. Armes et. al., Proc. 2007 IEEE Applied Power Electronics Conference.

BACKGROUND OF THE INVENTION

To meet industry needs for electrical power converters which convert AC to DC without injecting large amounts of harmonic currents into the power system, numerous transformer and converter topologies are available, some of which are described in the documents referenced above. Methods whereby three-phase power is converted to nine-phase power before processing, are described in several U.S. patents. For many industrial applications a small step down of voltage is desirable. Cost-effective designs used in the variable frequency drive industry, are cited in the references above. Continual pressures to reduce losses and cost, motivate creation of new autotransformer methods. A polygon transformer such as described by Zou et. al., in 2002 requires only five windings per phase, but has the disadvantage of having a large circulating third harmonic current. This significantly increases the transformer kVA rating. The 2007 patent described by Paice overcomes this disadvantage while still retaining five windings per phase.

The invention presented here is a new design that obtains further improvements in efficiency and flexibility by using six windings per phase.

BRIEF SUMMARY OF THE INVENTION

A three-phase, polygon connected autotransformer using appropriate turns ratios provides a nominally balanced nine-phase set of output voltages. The output voltages are smaller than the input voltages by about 11%, an amount especially suitable for 480 V industrial power converter systems. The invention requires six windings on each phase of the transformer, and has an equivalent double-wound kVA rating that is less than 48% of the load kW. It has great design flexibility and represents an improved practical alternative to the prior art.

If required, a wide range of output voltages can be obtained by feeding the three-phase input supply to tappings on one or more of the six windings or interconnections thereof.

In conjunction with an extra isolated winding, the autotransformer topology can be used as the secondary winding configuration of a double-wound isolation transformer. Because the polygon connection described provides an effective means to circulate third harmonic currents, the primary winding of such transformer can use any of the known transformer methods, such as wye, zig-zag, delta, extended delta, or polygon.

Figure 1:
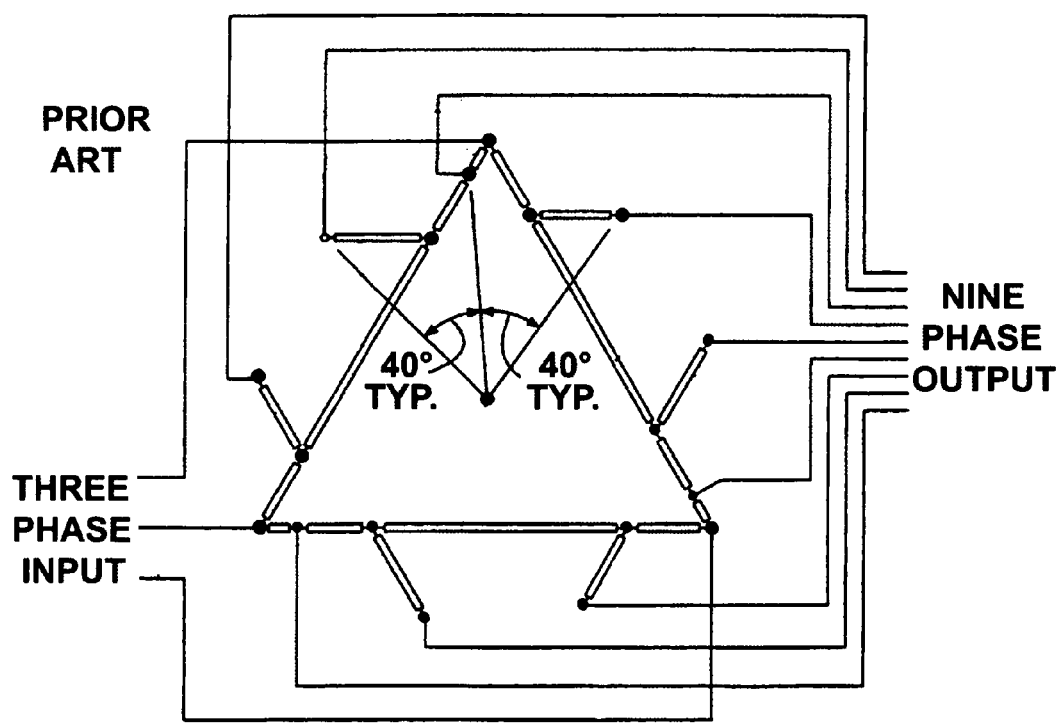
FIG. 1 shows the prior art of patent 5,619,407. Three lines drawn from the virtual neutral at the center of the delta illustrate three of the nine output voltage vectors with typically 40° separation. In this patent, the small step down of voltage desirable for typical industrial power converters is obtained by means of six non symmetrical stub windings placed at appropriate points on the delta. A three-phase supply is applied to the apexes of the delta and a nine phase output is obtained from six stub windings and three other connections on the delta.
Figure 2:
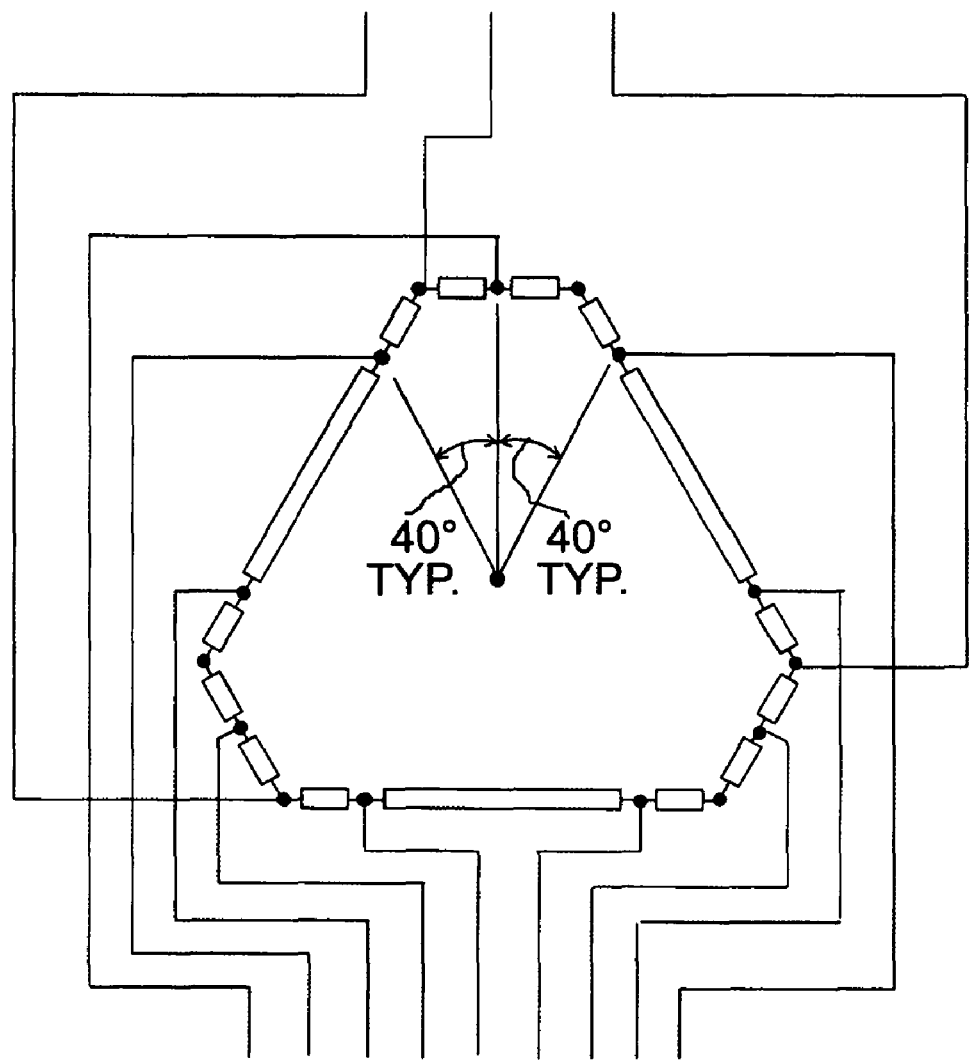
FIG. 2 shows the prior art of patent 6,335,872. This topology is excellent for loads not requiring third harmonics of current, but is inefficient for the type of load presented by a nine-phase AC to DC bridge converter, which requires about 84% third harmonic current. The third harmonic current circulates around the polygon and significantly raises the rms current in the windings.
Figure 3:
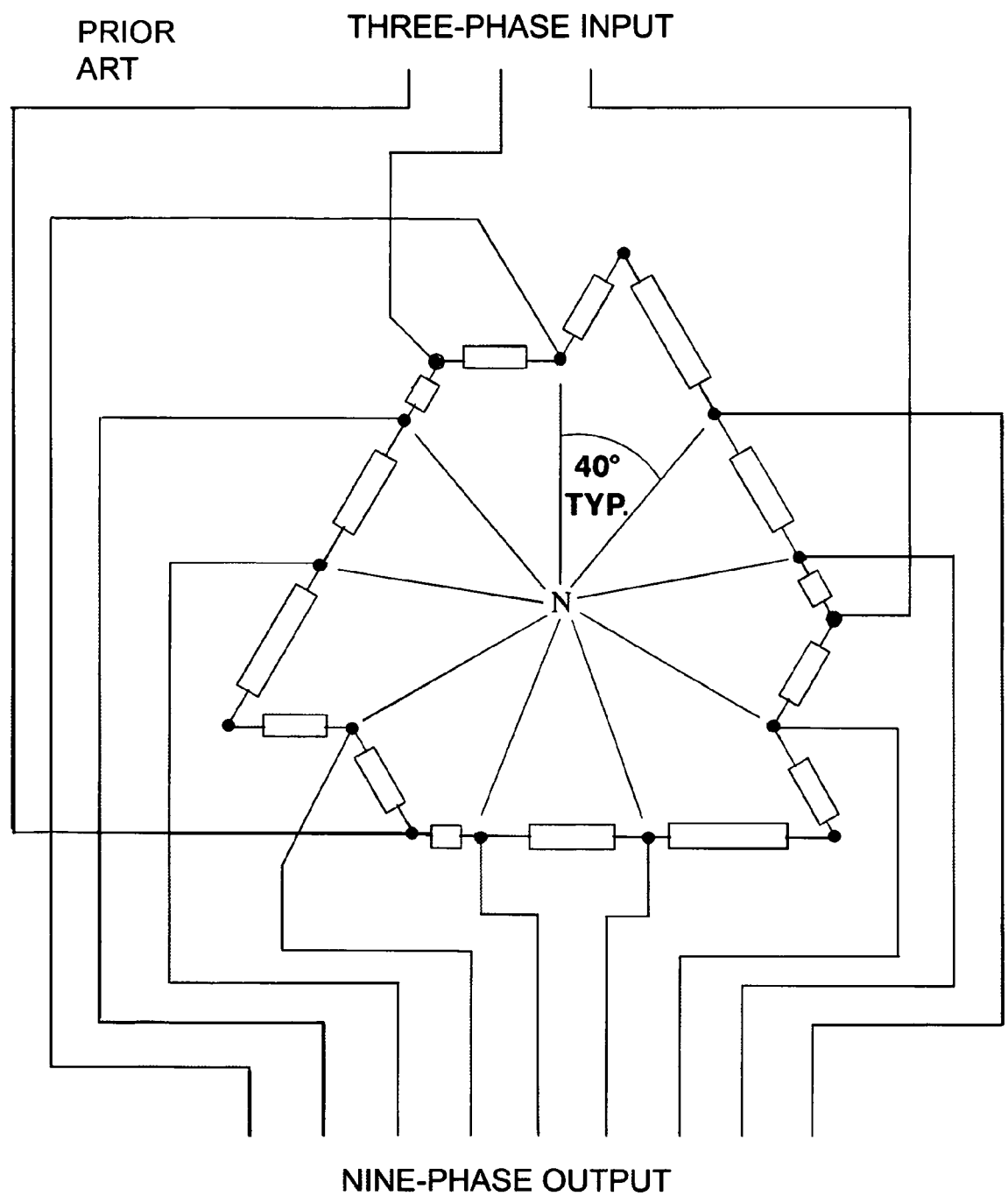
FIG. 3 shows the prior art in patent 7,274,280. In this patent, the polygon connections are configured so as to greatly reduce the third harmonic current circulating. This reduces the transformer rating to be less than 50% of the DC load rating.
Figure 4:
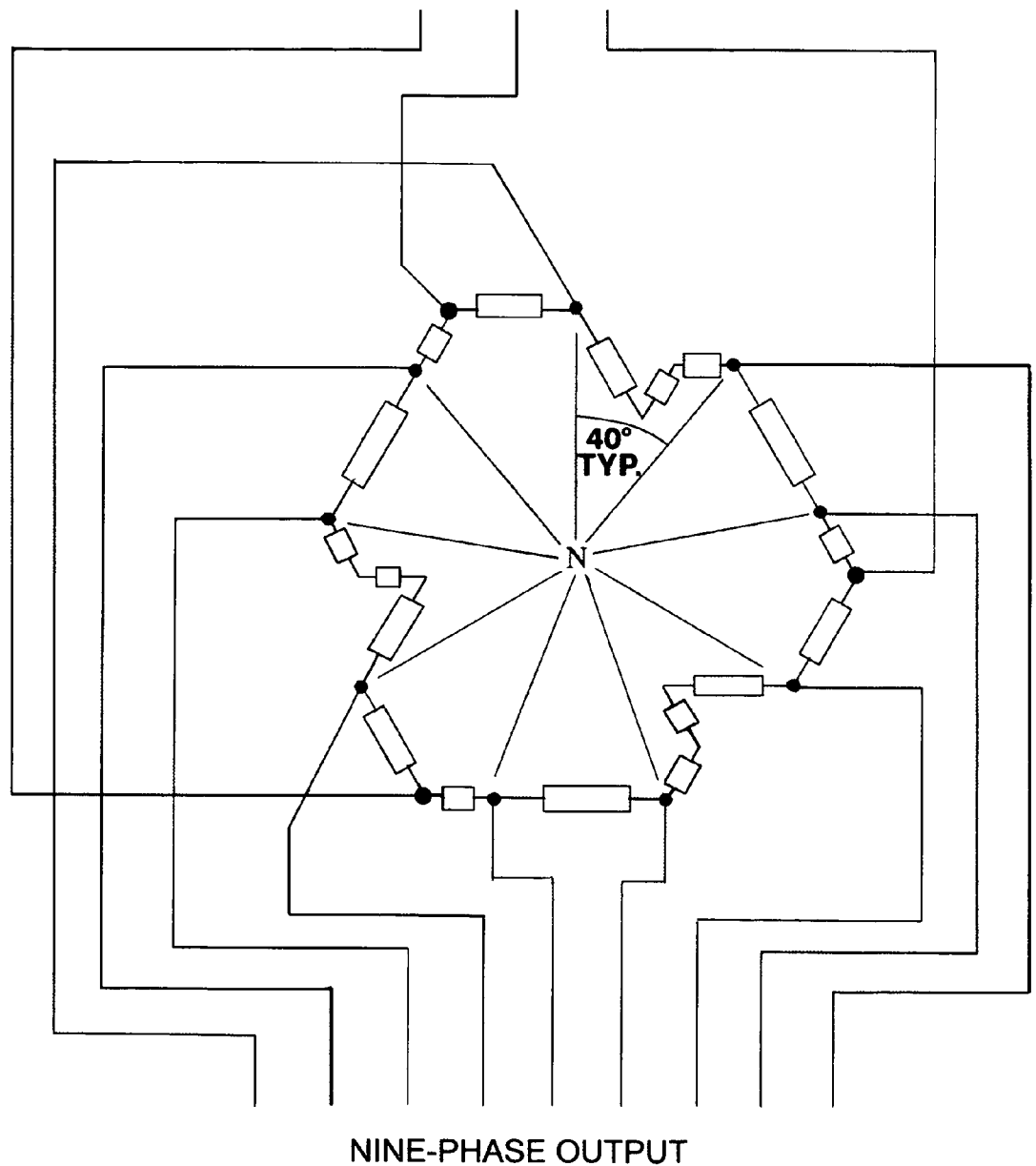
FIG. 4 Shows the topology of the preferred embodiment of the invention. Transformer windings are represented by rectangular boxes, and nodes by large dots. The invention not only enables the amplitude of third harmonic circulating current to be controlled but further reduces the transformer rating to be less than 48% of the DC load rating. The invention uses unique winding ratios such that a nine-phase output is obtained using six windings on each phase of the three-phases. The geometric shape of the topology is that of a multi-sided polygon. Nominally equal amplitude voltages separated by typically 40° are obtained at the output connections. The output voltage amplitude is about 11% less than that of the three-phase power source. The net result is an efficient, three-phase to nine-phase autotransformer topology.
Figure 5:
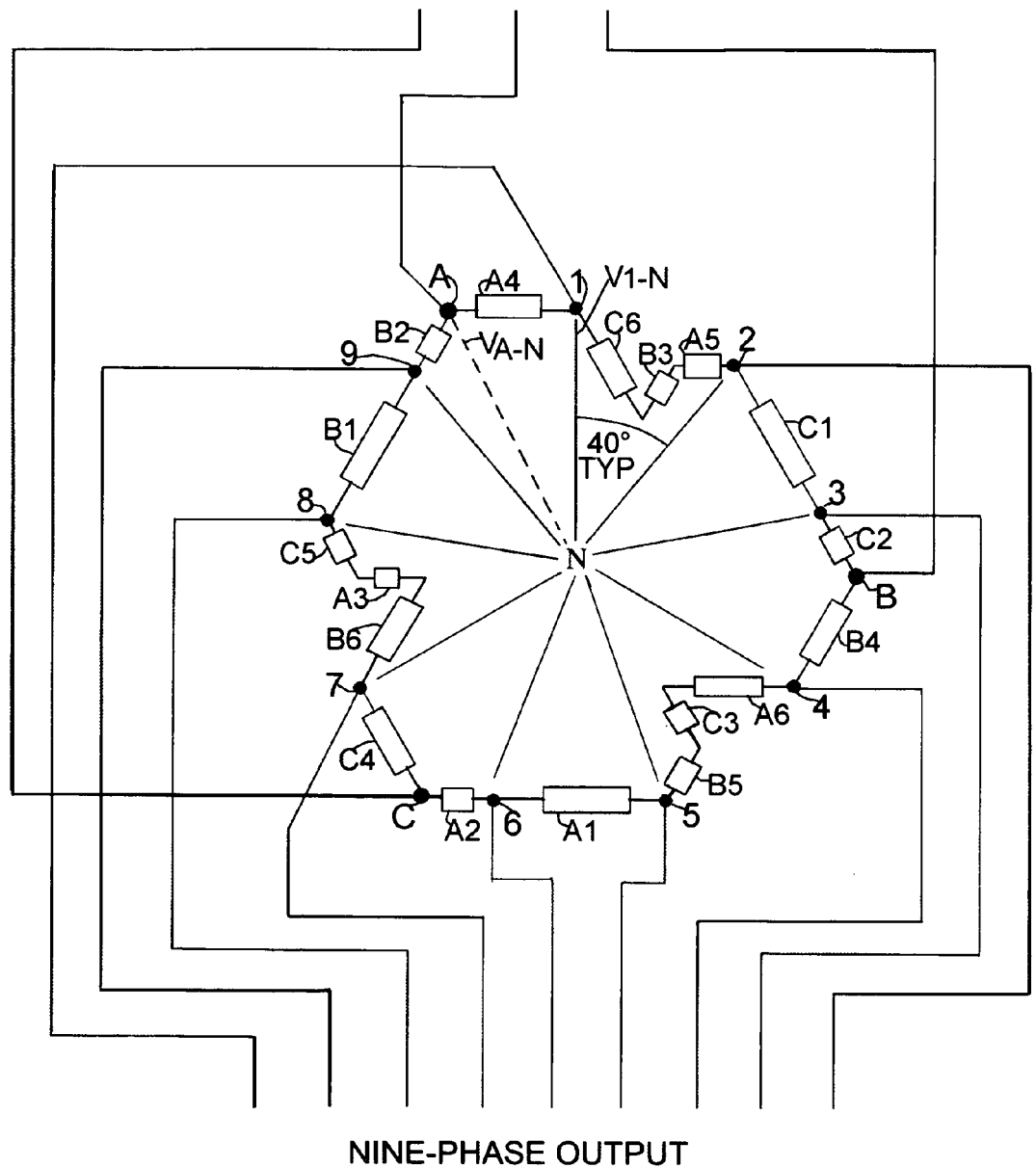
FIG. 5 shows the preferred embodiment of the invention with labels to facilitate detailed discussion. A three-phase input voltage is applied to nodes/terminals A, B, and C on the polygon. A virtual neutral point, N, provides a reference point to define output and input voltages. For example, the voltage between A and N is one of the input line-to-neutral voltages. It is represented by the dashed line labeled, $V_{A-N}$. The voltage from node 1 to N is one of the line-to-neutral output voltages. It is presented by the full line labeled, $V_{1-N}$. Nine output voltages are available at nodes numbered 1 through 9. They are represented by lines emanating from the virtual neutral node and pointing toward the node number. The output voltages are nominally of the same amplitude and typically are displaced in sequence by 40°.

Windings on each phase are shown as rectangles. Windings labeled A1, A2, A3, A4, A5 and A6 are the six windings associated with the A phase. Windings B1, B2, B3, B4, B5 and B6 are windings with similar turns on the B phase, and C1, C2, C3, C4, C5, and C6 are similar windings on the C phase of the transformer. Windings with the same number label, for example windings A3, B3, and C3 have the same number of turns. In analysis work these are conveniently simply referred to as A3, B3, C3 turns etc. Tappings on some of the windings can offer means to obtain various output voltage amplitudes. The windings displayed in FIG. 5 provide a means to help understand the improvement of the invention in relation to the prior art described in patents numbered 6,335,872, and 7,274,280.

It will be clear to those skilled in the art that windings such as C6, B3, and A5, or windings A6, C3, and B5, or windings B6, A3, and C5 can be connected in any of six consecutive sequences to obtain the same overall basic result for a nine-phase transformer. This flexibility provides the opportunity to optimize winding interconnections and leakage inductance; it is an important practical feature of the invention.

Figure 6:
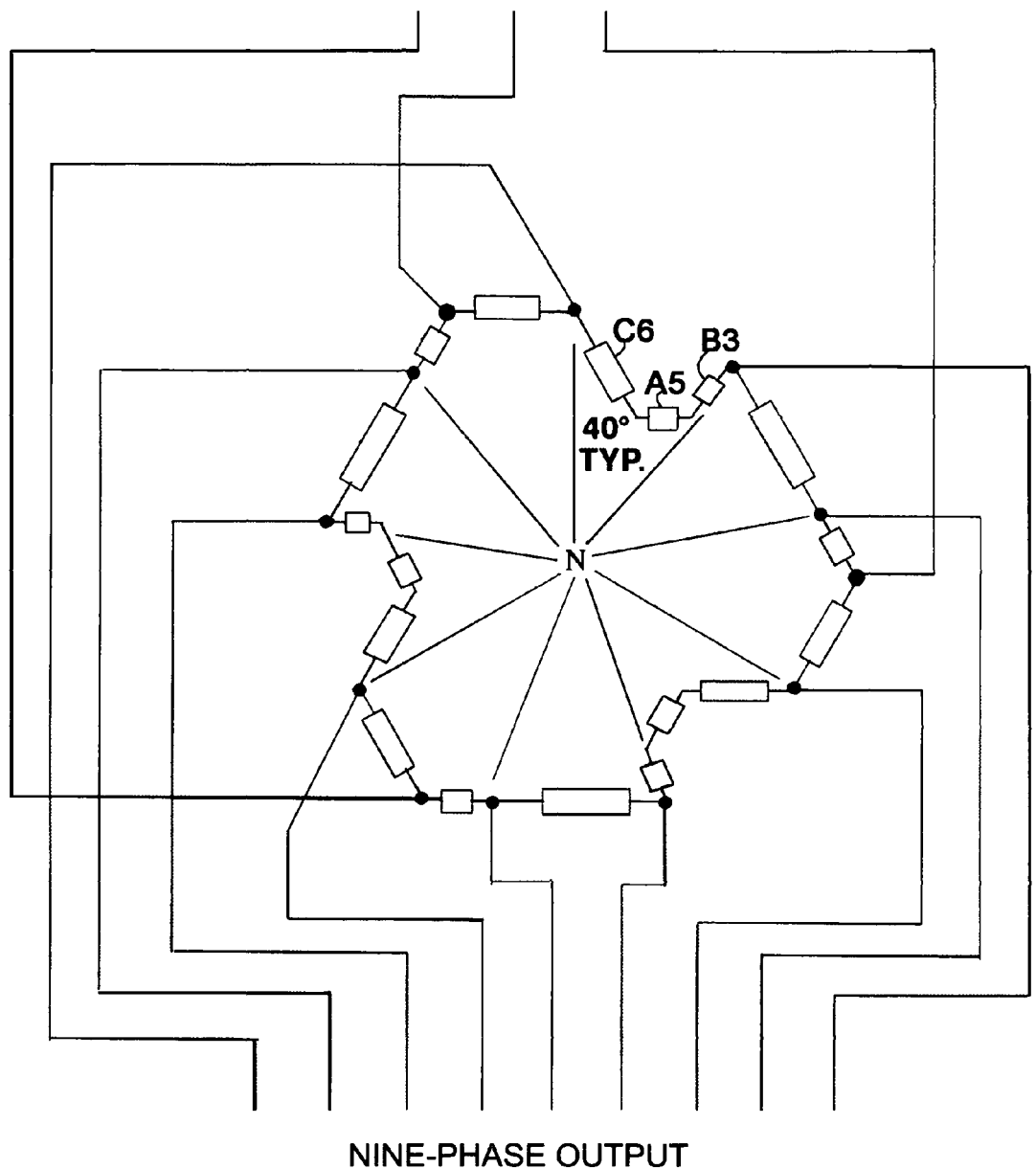

FIG. 6 Illustrates a first variation in the connection of the windings A5, B3, and C6 in the invention.

Figure 7:
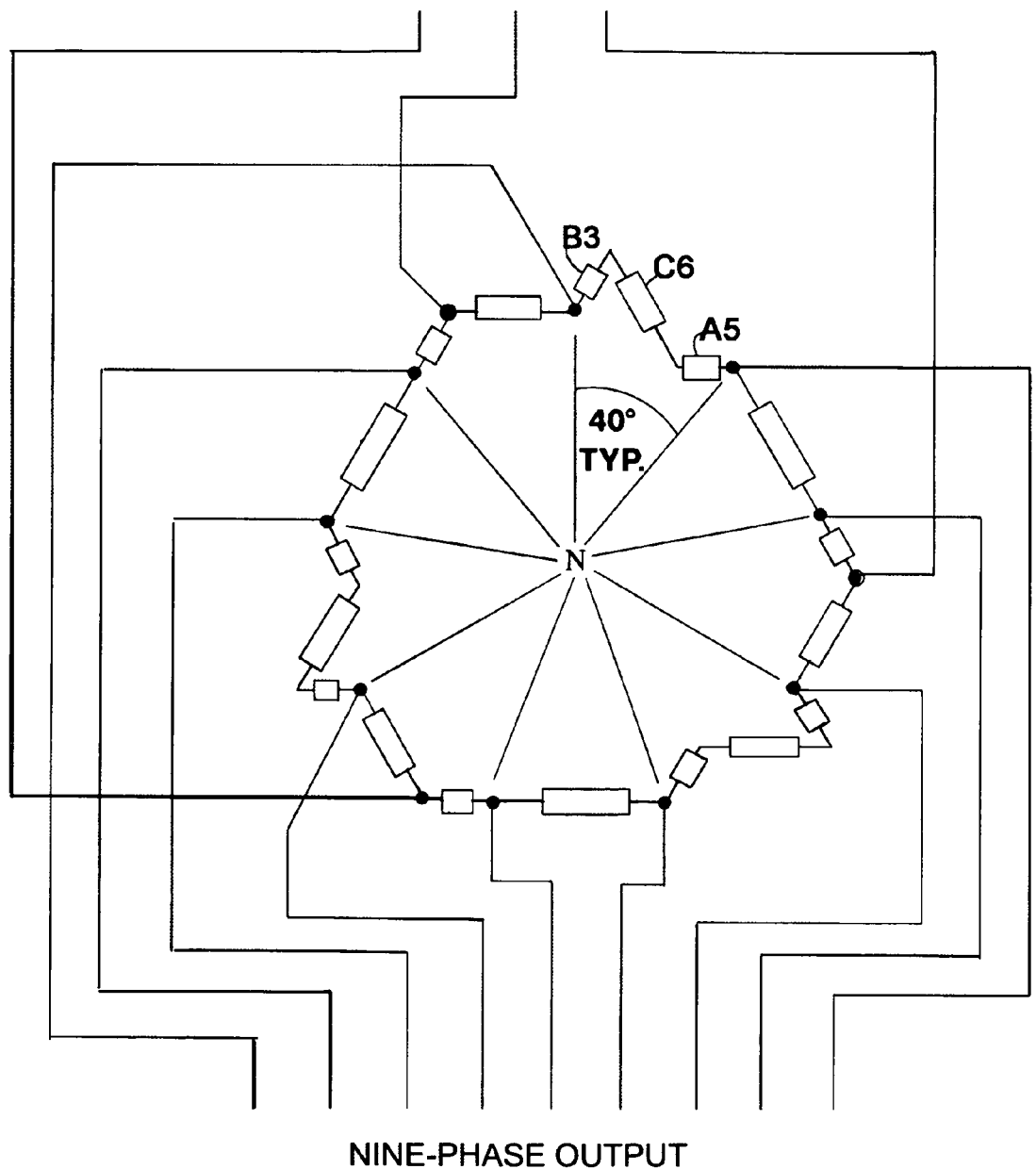

FIG. 7 Illustrates a second variation in the connection of the windings A5, B3, and C6 in the invention.

Figure 8:
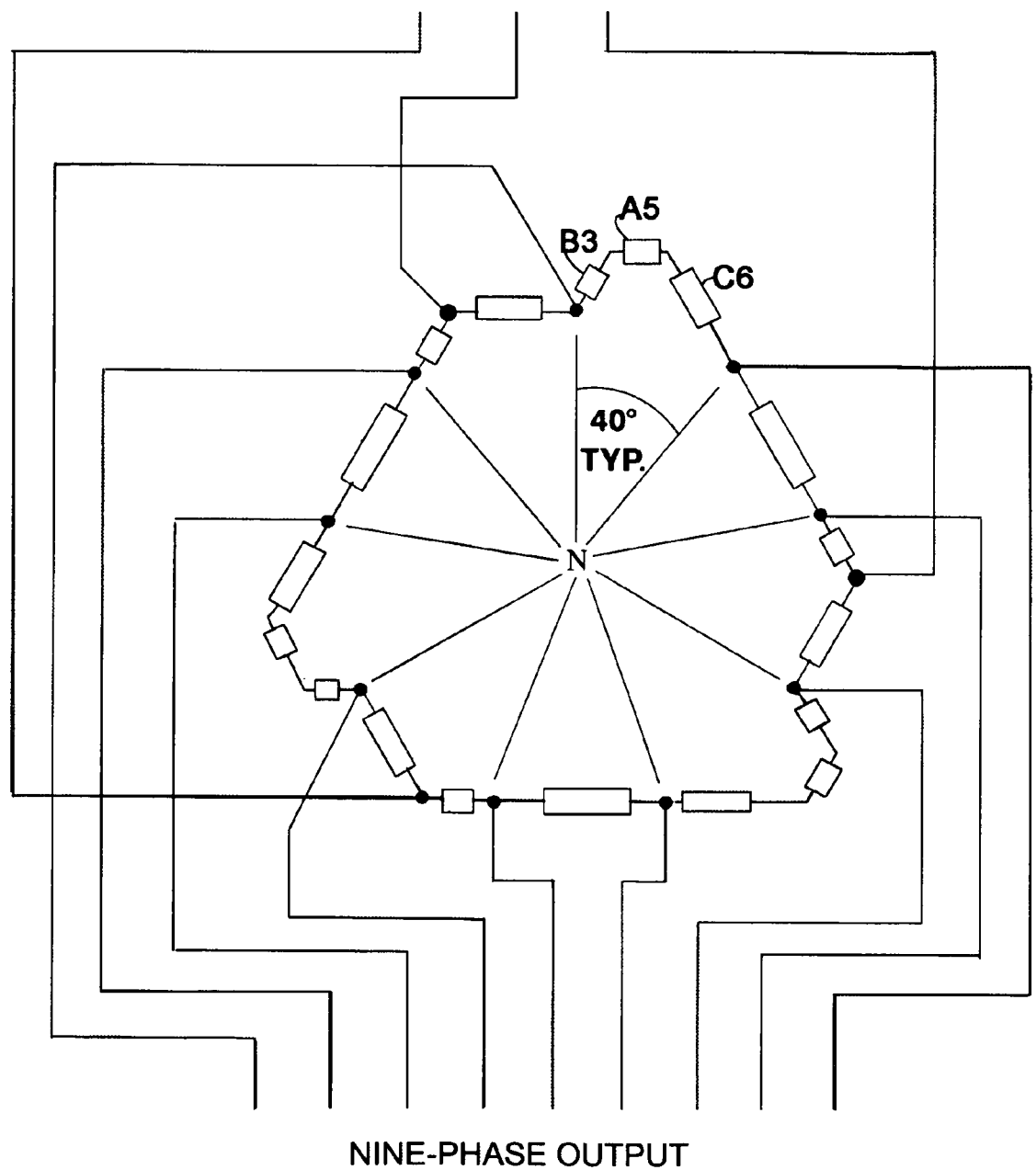

FIG. 8 Illustrates a third variation in the connection of the windings A5, B3 and C6 in the invention.

Figure 9:
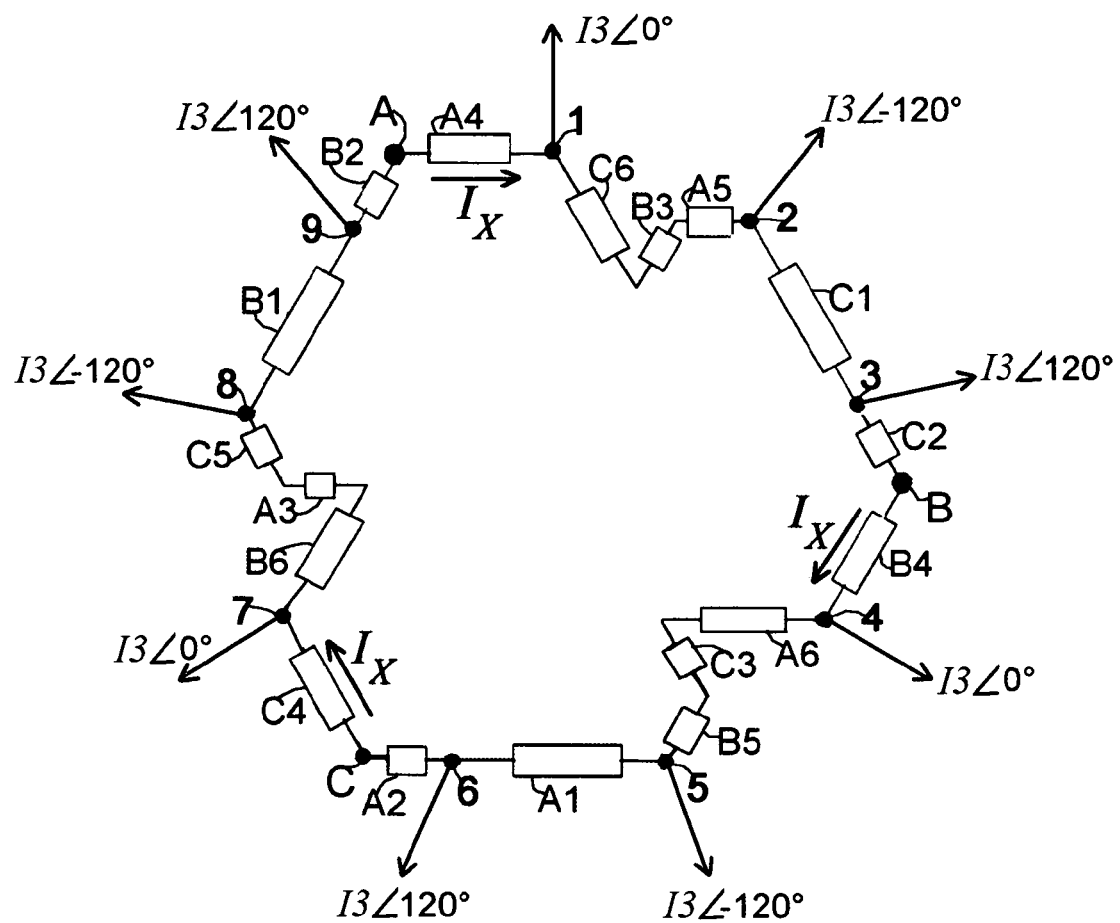

FIG. 9 shows the invention of FIG. 5 with third harmonic output currents, labeled as I3 and with an appropriate phase angle, flowing out from the polygon nodes numbered 1 through 9. This figure facilitates calculation of the third harmonic current labeled as, $I_X$, that flows in windings such as A4, B4, and C4, also windings A2, B2, and C2.

Figure 10:
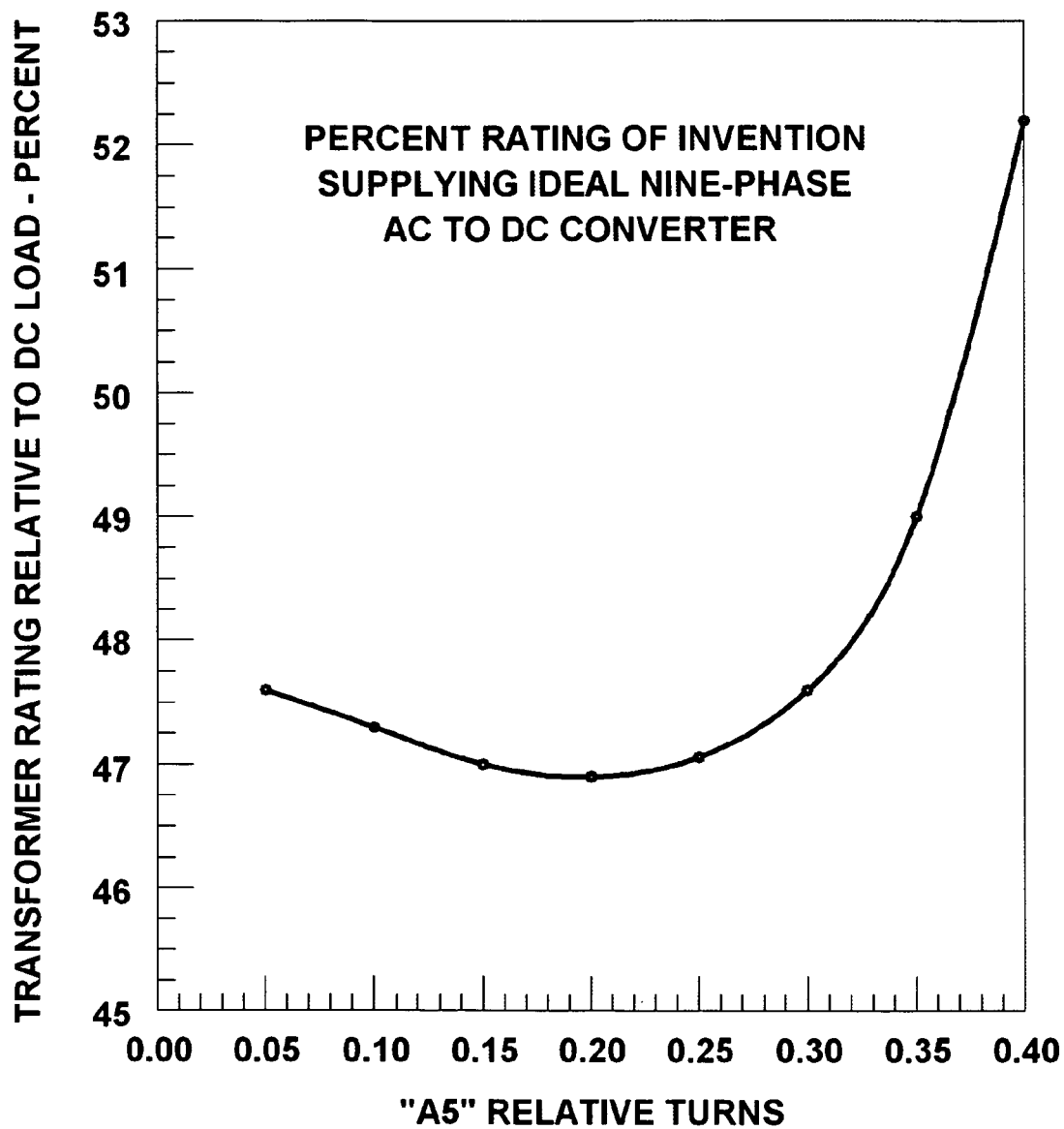

FIG. 10 shows the effect of turns such as A5 upon the VA rating of the invention when used to power a nine-phase AC to DC converter. The invention reduces overall transformer rating by appropriate selection of the turns.

DESCRIPTION OF THE INVENTION

The essence of the invention lies in the relative number of turns on each winding, and the interconnections. By these means, circulating third harmonic currents caused by a non-linear load, such as a nine-phase bridge converter, are reduced to a value that has tolerable effect on the winding current rating, also the transformer rating is further optimized by suitable selection of windings such as C6, B3, and A5. The polygon windings carry both load and circulating third harmonic currents. This results in good utilization of the copper or aluminum conductors used in the windings.

Referring to FIG. 5, a three phase supply is connected to terminals A, B, and C. A virtual neutral point defined as node N provides a reference point for describing voltage vectors.

Input voltage associated with phases of the power supply line-to-neutral voltage, for example $V_{A-N}$ is represented by a dashed line drawn from the neutral point N toward node A. The amplitude of this voltage is defined as $V_N$. For example $V_{A-N}$, $V_{B-N}$, and $V_{c-N}$, all have an amplitude of $V_N$ Output voltage vectors are indicated by full lines pointing toward the appropriate node. It is convenient to assume an output voltage of unity and make the vector pointing to node 1 the reference vector. Thus, the output voltage vector at node 1 is defined as $V_{1-N}=1\angle 0°$.

Outputs are available at nodes/terminals labeled 1 through 9, and have a successive phase shift of typically 40°. For example, the voltage at terminal 2 is defined as $V_{2-N}=1\angle 40°$, and so on To determine the relative value of windings in the polygon connection we can use vector algebra. Windings such as C6, B3, and A5 are important design variables in the invention, but by selecting one of them, for example A5, the other two are effectively defined. For example, refer to FIG. 5 and define A5 as the design variable. Windings B6 and B3 are then found in the following manner.

The voltage between nodes 1 and 2 in FIG. 5 is defined by:

$$1\angle 0° - 1\angle -40° = C6\angle 30° + B3\angle 150° - A5\angle -90° \quad (1)$$

Solving equation (1) gives: B3=(0.5077−A5) and C6= (0.7779−A5)

As noted previously, windings with a different letter but the same number have the same fractional value. Thus B3 has the same numerical value as A3 and C3. And C6 has the same numerical value as A6 and B6.

A similar analysis method can be used to determine the remaining polygon parameters. For example, refer again to FIG. 5, and apply the vector algebra to the voltage between nodes 2 and 3, then:

$$1\angle -40° - 1\angle -80° = C1 \quad (2)$$

Solving equation (2) gives the amplitude for C1 as 0.68404.

Windings such as B2 and A4 are found using the vector algebra in a similar procedure.

Since different phases have the same numerical value it is convenient to tabulate the results with respect to one arbitrarily selected phase. Phase A is used in this analysis, and a list defining the polygon design parameters is given below.

A1=0.68404

A2=0.27014

A3=(0.5077−A5)

A4=0.50771

A5=a variable of the invention.

A6=(0.7779−A5)

Third harmonic currents flowing in the polygon transformer windings can have a significant impact on the transformer rating. They are calculated in the following manner.

Referring to FIG. 9, third harmonic currents flowing from each of the nine output nodes are represented by straight lines with an arrowhead. They are labeled with magnitude I3 and an appropriate phase angle, which is conveniently set at zero in outputs from nodes 1, 4, and 7. The phase angle associated with each current is relevant to the third harmonic only. It incorporates the fact that when a fundamental current moves through an angle of 40°, its third harmonic moves through an angle of 3×40°, namely 120°.

No third harmonic current flows into or out of the three phase lines that would normally connect to nodes/terminals such as A, B, and C because at those terminals any third harmonic potentials would be equal in magnitude and phase. To calculate the transformer winding third current it is convenient to first calculate, $I_X$ the third harmonic current flowing in windings A4, B4, and C4. This is found by equating the algebraic sum of third harmonic ampere turns in each coil to zero. The solution is presented in equation (3).

$$I_X = \frac{(C6 + A1 + B3 - A5)I3\angle 0° + (A1)I3\angle -120°}{(A1 + A2 + C6 + B3 - A4 - A5)} \quad (3)$$

This result can be used to determine the third harmonic current in each of the transformer windings and thence the effect of third harmonic current on the transformer rating.

For example, the current flowing in windings such as C6 is $(I_X - I3\angle 0°$, and the current in windings such as C1 is $(I_X - I3\angle 0° - I3\angle -120°$.

From these results, a third harmonic VA rating for the transformer can be obtained using the definition introduced in the paper by J. E. Armes, et. al. The equation is given below.

Third harmonic VA factor=ΣFractional winding×third harmonic current through it.

The third harmonic VA factor does not, of itself, establish the total transformer kVA rating but it is an important design consideration. By minimizing it, efficient transformer designs can be obtained and potential performance problems avoided.

Sample results from this calculation are given in TABLE 1. The rapid increase in third harmonic rating as A5 exceeds 0.4 serves as a caution to avoid such a ratio.

The invention design variable, A5, can be chosen from a wide range of values, and a value of about 0.27 appears especially suitable where small numbers of turns are needed. It not only provides a low third harmonic rating, but as shown in TABLE 2 it facilitates selection of the same number of turns for windings A5 and A2. Also, turns A4 and A6 are the same.

FIG. 10 depicts the calculated effects on the autotransformer power rating when all harmonics in the load and winding currents are considered. They represent the case for an ideal nine-phase AC to DC converter. Transformer leakage factors are not included.

In practice, complete transformer rating analysis is only feasible using a computer simulation that incorporates specific transformer parameters, including winding coupling factors.

TABLE 1

Autotransformer parameters in invention as turns A5 are varied

| Turns A5 | Turns B3 | Turns C6 | Per phase 3$^{rd}$ harmonic VA factor |
|---|---|---|---|
| 0 | 0.5077 | 0.7778 | 1.245 |
| 0.100 | 0.4077 | 0.6778 | 1.215 |
| 0.200 | 0.3077 | 0.5778 | 1.179 |
| 0.270 | 0.2377 | 0.5078 | 1.157 |
| 0.300 | 0.2077 | 0.4778 | 1.154 |
| 0.400 | 0.1077 | 0.3778 | 1.336 |
| 0.500 | 0.7699 | 0.2778 | 3.187 |

Design Considerations

In a practical design it is helpful to first choose the winding that has the smallest number of turns. Usually this will be the A2 winding. Other turns are then chosen in a manner that most nearly matches the ideal turns ratios. TABLE 2 gives ideal fractional turns for all the windings when A5 is selected to match the A2 winding. It also provides examples of practical integer values for winding turns. TABLE 2 is just one example. Other tables can be drawn for different values of A5.

The output voltage vectors shown in TABLE 2 are given for three outputs, namely, $V_{9-N}$, $V_{1-N}$, and $V_{2-N}$. These three vectors are representative of the nine total output voltages. Thus the amplitude of vectors $V_{3-N}$, $V_{4-N}$, and $V_{5-N}$, are similar, as are the vectors $V_{6-N}$, $V_{7-N}$, and $V_{8-N}$. Between any two consecutive output vectors the phase shift is nominally 40°. For an AC output voltage of 1.0∠0° at node 1 in FIG. 5, the idealized input voltage is 1.12145∠26.9°.

With an input line-to-neutral voltage of say 470 volts, the line-to-neutral output voltages are (470/√3)/1.121, i.e., 242 V. The corresponding open circuit DC voltage from a nine phase bridge rectifier is 670.5 volts.

The AC voltage across individual windings is determined from the relative fractional size of the turns and the output voltage. For example, the voltage across the A1 winding will be, 242×0.684, i.e., 165.5 volts.

TABLE 2

Ideal turns ratios and practical turns when A5 is selected as 0.270

| Turns A1 ideal 0.6840 | Turns A2 0.270 ideal | Turns A3 0.2376 ideal | Turns A4 0.5077 ideal | Turns A5 0.270 ideal | Turns A6 0.5077 ideal | Line-to-neutral output voltage relative to line-to-neutral source voltage. (Output phase angles are given relative to each other) |
|---|---|---|---|---|---|---|
| 13 | 5 | 5 | 10 | 5 | 10 | $V_{9-N}$ = 0.897 ∠40.33°<br>$V_{1-N}$ = 0.885 ∠0.00°<br>$V_{2-N}$ = 0.897 ∠−40.33° |
| 20 | 8 | 7 | 15 | 8 | 15 | $V_{9-N}$ = 0.892 ∠40.16°<br>$V_{1-N}$ = 0.892 ∠0.00°<br>$V_{2-N}$ = 0.892 ∠−40.16° |
| 21 | 8 | 8 | 16 | 8 | 16 | $V_{9-N}$ = 0.897 ∠40.19°<br>$V_{1-N}$ = 0.886 ∠0.00°<br>$V_{2-N}$ = 0.897 ∠−40.19 |

Practical variations of ±3% from the ideal ratios may be tolerable, but final calculations are best made from computer simulations that include winding resistance and leakage inductance.

It will be clear to those skilled in the art that the three-phase to nine-phase autotransformer can be constructed using any of the standard magnetic core arrangements, including three single-phase transformers.

What I claim is:

1. An autotransformer for converting three-phase AC power to nine-phase AC power comprising: a first coil, a second coil and a third coil; each of said first, second and third coil containing serial windings and isolated windings;

said serial windings and isolated windings being magnetically coupled;

said serial and isolated windings on said first coil second coil and third coil containing a start end and a finish end such that current entering the start end produces a magnetic flux in one direction whereas a current entering the finish end produces a magnetic flux in the opposite direction;

the finish end of a serial winding on the first coil being connected to the finish end of an isolated winding on the third coil with the start end of said isolated winding being connected to a series connection of three other isolated windings; the three other isolated windings being selected from the first coil, the second coil and the third coil and being arranged in a sequence of;

first coil, second coil, third coil, or first coil, third coil, second coil, or second coil, first coil, third coil, or second coil, third coil, first coil, the end of the series connection of said three other isolated windings being connected to the start end of a serial winding on the second coil;

said interconnections of windings being repeated sequentially for all three coils until all windings are interconnected to form a multi-sided polygon;

said multiple interconnections of windings forming multiple multi-sided polygons;

said multiple polygon topologies including symmetrically disposed nodes;

wherein symmetrically disposed nodes provide points for applying three-phase AC input voltage and extracting AC output voltages of predetermined amplitude and phase.

2. The autotransformer of claim 1 wherein the input voltage is a three-phase AC supply and the output is a nine-phase AC supply with voltages nominally equal in amplitude and typically spaced by 40°.

3. The autotransformer of claim 1 with an additional isolated winding on each coil such that three phase AC input power may be applied through such isolated windings to convert the autotransformer to a double-wound transformer.

4. The autotransformer of claim 1 wherein specific amplitude AC output voltages may be less than greater than or equal to that of the three-phase AC supply.

5. The autotransformer of claim 2 wherein a nine-phase output is connected to a nine-phase rectifying device so as to produce an 18-pulse converter with low output voltage ripple on the DC voltage and with low harmonic distortion of the AC input harmonic current.

6. The autotransformer of claim 2 wherein series reactance is included in the three phase AC input power source so as to further attenuate high frequency harmonic currents that may be associated with a multi-pulse AC to DC converter.

7. An autotransformer for converting three-phase AC power to nine-phase AC power comprising: a first coil, a second coil and a third coil; each of said first, second and third coil containing serial windings and isolated windings; wherein said isolated windings are not tapped;

said serial windings and isolated windings being magnetically coupled;

said serial and isolated windings on said first coil second coil and third coil containing a start end and a finish end such that current entering the start end produces a magnetic flux in one direction whereas a current entering the finish end produces a magnetic flux in the opposite direction;

the finish end of a serial winding on the first coil being connected to the finish end of an isolated winding on the third coil, with the start end said isolated winding being connected to a series connection of three other isolated windings; the three other isolated windings being selected from the first coil, the second coil and the third coil and being arranged in a sequence of:

third coil, first coil, second coil, or third coil, second coil, first coil;

the end of the series connection of said three other isolated windings being connected to the start end of a serial winding on the second coil;

said interconnections of windings being repeated sequentially for all three coils until all windings are interconnected to form a multi-sided polygon;

said two interconnection sequences of windings forming two multi-sided polygons;

said polygon topologies including symmetrically disposed nodes; and wherein symmetrically disposed nodes provide points for applying three-phase AC input voltage and extracting AC output voltages of predetermined amplitude and phase.

8. The autotransformer of claim 7 wherein the input voltage is a three-phase AC supply and the output is a nine-phase AC supply with voltages nominally equal in amplitude and typically spaced by 40°.

9. The autotransformer of claim 7 with an additional isolated winding on each coil such that three phase AC input power may be applied through such isolated windings to convert the autotransformer to a double-wound transformer.

10. The autotransformer of claim 7 wherein specific amplitude AC output voltages may be less than greater than or equal to that of the three-phase AC supply.

11. The autotransformer of claim 8 wherein a nine-phase output is connected to a nine-phase rectifying device so as to produce an 18-pulse converter with low output voltage ripple on the DC voltage and with low harmonic distortion of the AC input harmonic current.

12. The autotransformer of claim 8 wherein series reactance is included in the three phase AC input power source so as to further attenuate high frequency harmonic currents that may be associated with a multi-pulse AC to DC converter.

\* \* \* \* \*